United States Patent [19]

Hufford

[11] Patent Number: 5,289,759
[45] Date of Patent: Mar. 1, 1994

[54] FORCED STEAM BULK FOOD COOKER/BLANCHER

[75] Inventor: David W. Hufford, Walla Walla, Wash.

[73] Assignee: Key Technology, Inc., Walla Walla, Wash.

[21] Appl. No.: 845,383

[22] Filed: Mar. 3, 1992

[51] Int. Cl.$^5$ .................. A47J 27/16; A47J 27/58; A23L 31/00
[52] U.S. Cl. ......................... 99/330; 99/386; 99/404; 99/443 C; 99/477; 99/483; 219/388; 219/401
[58] Field of Search .................. 99/360, 330, 373, 331, 99/386, 391, 404, 423, 427, 443 R, 443 C, 467, 473, 477–479, 483; 219/388, 401, 400; 126/369, 21 A; 134/145, 151; 426/510, 523

[56] References Cited

U.S. PATENT DOCUMENTS

| | | | |
|---|---|---|---|
| 887,628 | 5/1908 | Hall | 99/477 |
| 1,391,821 | 9/1921 | Davies . | |
| 2,389,330 | 11/1945 | Thompson | 198/211 |
| 2,788,735 | 4/1957 | Farace | 99/443 |
| 3,239,651 | 3/1966 | Silberman | 219/388 |
| 3,513,293 | 5/1970 | Beck | 219/388 |
| 3,678,244 | 7/1972 | Worline | 219/388 |
| 3,736,860 | 6/1973 | Vischer, Jr. | 99/339 |
| 3,823,660 | 7/1974 | Nerthling | 99/386 |
| 3,908,533 | 9/1975 | Fagerstrom et al. | 99/386 |
| 3,961,571 | 6/1976 | Decuir | 99/474 |
| 3,982,481 | 9/1976 | Console et al. | 99/477 |
| 4,092,911 | 6/1978 | Goodale | 99/483 |
| 4,436,082 | 3/1984 | Hiller et al. | 126/348 |
| 4,525,370 | 6/1985 | Parkes | 426/508 |
| 4,876,437 | 10/1989 | Kondo | 219/388 |
| 4,887,524 | 12/1989 | Ellis-Brown | 99/404 X |
| 5,072,663 | 12/1991 | Ellis-Brown | 99/443 C |
| 5,154,338 | 10/1992 | Okuno et al. | 219/388 |
| 5,184,538 | 2/1993 | Ledet | 99/477 |

FOREIGN PATENT DOCUMENTS 8601065 2/1986 PCT Int'l Appl. .................. 219/388

OTHER PUBLICATIONS

Rose, Walter W. et al., "Energy Conservation In The Food Processing Industry," DOE-NFPA, Jun. 1981.

Primary Examiner—Timothy F. Simone
Attorney, Agent, or Firm—Wells, St. John, Roberts, Gregory & Matkin

[57] ABSTRACT

The preferred embodiment described in this application is a forced-steam cooker/blancher (100) for cooking or blanching a depth of bulk food particles by supporting the food particles on an extended perforated particle support surface (122) and by forcing steam through said depth of bulk food particles and through perforated particle support surface (122). The cooker/blancher includes walls (138) extending upwardly from particle support surface (122). Particle support surface (122) is perforated to allow fluid passage therethrough. Pressure means is included for forcing steam through a depth of food particles (141) contained within walls (138) on support surface (122) and through perforated particle support surface (122).

21 Claims, 6 Drawing Sheets

FIG 2
PRIOR ART

FORCED STEAM BULK FOOD COOKER/BLANCHER

TECHNICAL FIELD

This invention relates to continuous-process steam cookers and blanchers for cooking and blanching a continuous flow of bulk food particles.

BACKGROUND OF THE INVENTION

Figure 1:
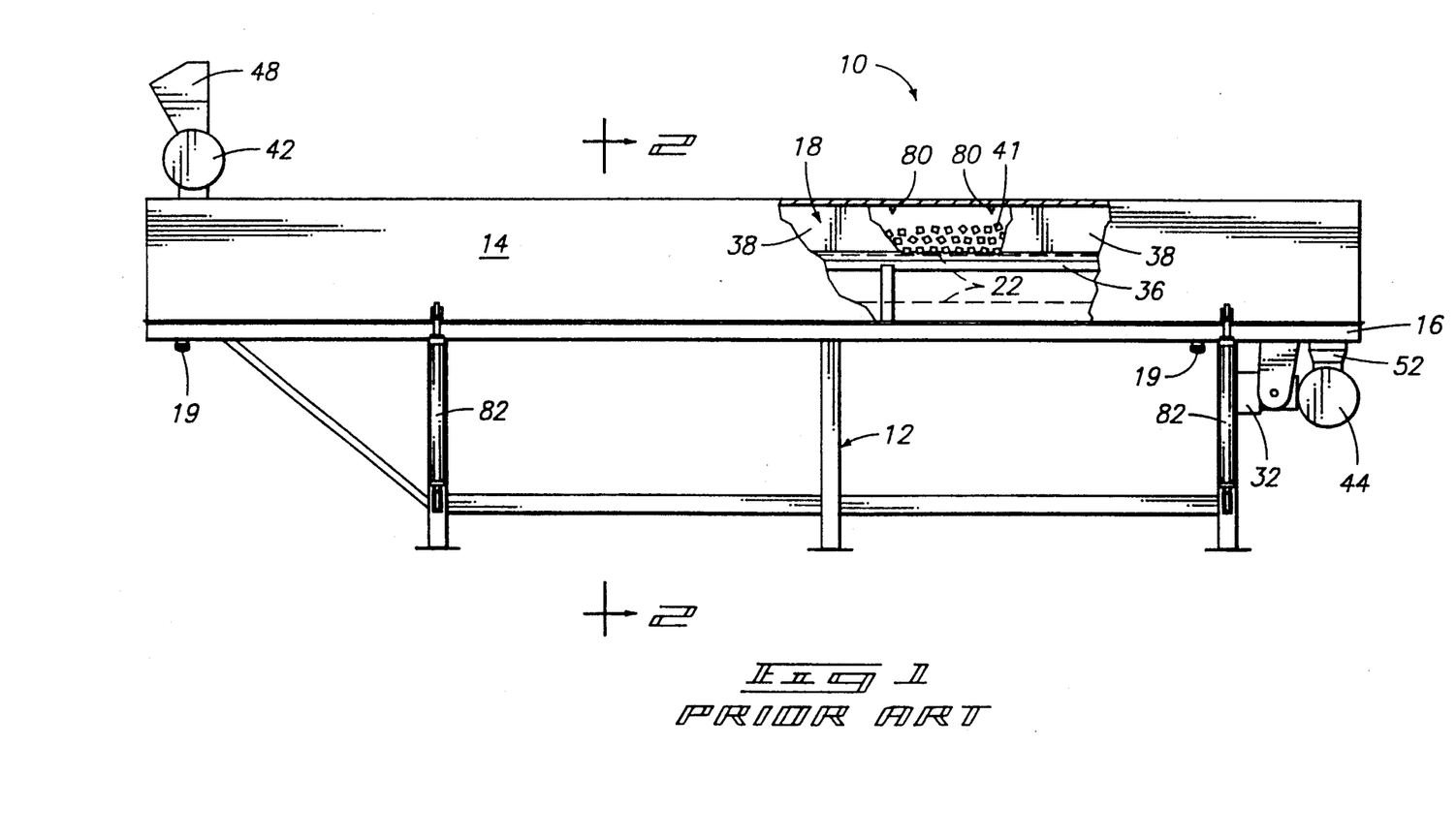
FIG. 1 is a side view of a prior art continuous process blancher/cooker, with its outer cover and inner sidewalls partially broken away.
Figure 2:
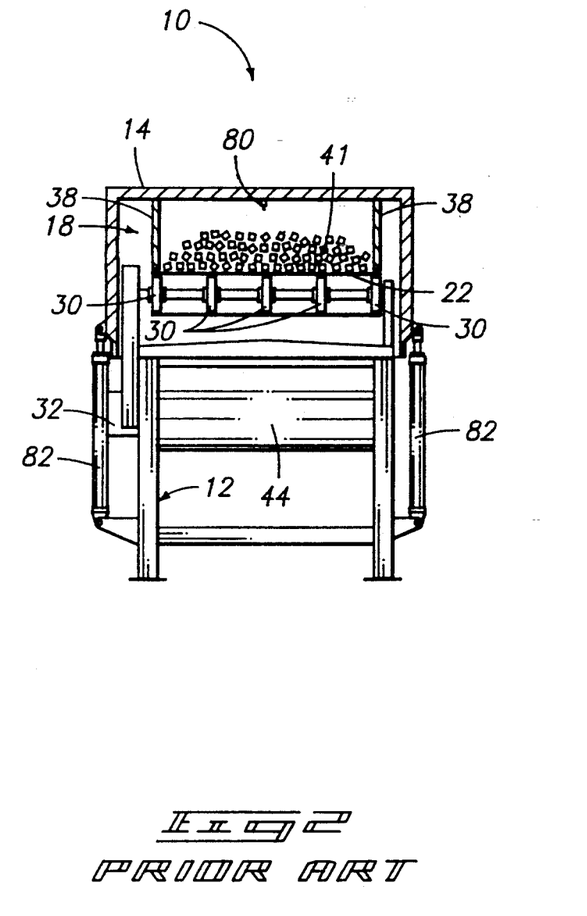
FIG. 2 is a cross-sectional view of the prior art blancher/cooker of FIG. 1 taken along line 2—2 of FIG. 1.

FIGS. 1 and 2 illustrate a prior art continuous process steam cooker and blancher, generally designated by the reference numeral 10. Cooker/blancher 10 is capable of cooking or blanching a continuous flow of bulk food particles such as diced potatoes or other vegetables. Cooker/blancher 10 includes a frame 12, an outer cover 14, and a lower drip pan 16. Outer cover 14 seals over lower drip pan 16 to form a steam housing 18. Steam housing 18 rests atop frame 12. Outer cover 14 and lower drip pan 16 are insulated to conserve heat within steam housing 18. Drains 19 are provided in lower drip pan 16 to allow condensed water to escape steam housing 18.

An endless belt conveyor 22 is mounted in housing 18 and extends from an infeed end to an outfeed end. A conveyor drive motor 32 is connected to a set of drive rollers 30 by a conveyor drive belt (not shown) to drive belt conveyor 22. A conveyor support rail 36 runs longitudinally beneath the upper run of belt conveyor 22 at its lateral edges to provide vertical support to belt conveyor 22 along its length.

Outer cover 14 includes opposed inner sidewalls 38 which extend longitudinally above the lateral edges of belt conveyor 22. Sidewalls 38 extend within steam housing 18 along the entire length of belt conveyor 22 and outer cover 14 to contain a depth of bulk food particles 41 on belt conveyor 22 between sidewalls 38 and to seal between the inner sidewall and the belt conveyor.

Infeed and outfeed rotary airlock valves 42 and 44 are attached to the extreme longitudinal ends of steam housing 18 to allow food particles 41 to enter and exit steam housing 18 while maintaining a sealed atmosphere within steam housing 18. Each of rotary valves 42 and 44 contains a lateral shaft to which a plurality of radially extending blades are attached. The shaft and attached blades rotate to transfer food particles through the rotary valve without allowing steam to escape from steam housing 18.

Infeed rotary valve 42 has an upper hopper 48 which funnels food particles into rotary valve 42. A lower chute (not shown) directs food particles from rotary valve 42 onto belt conveyor 22 at its infeed end. Outfeed rotary valve 44 at the outfeed end has an upper mouth 52 which receives food particles as they fall from the end of belt conveyor 22 and which funnels the food particles into outfeed rotary valve 44 for transfer from steam housing 18.

Rotary valve 42 feeds a continuous flow of bulk food particles 41 onto belt conveyor 22. The particles accumulate to a desired depth and travel through steam housing 18 between sidewalls 38 on belt conveyor 22, eventually falling off belt conveyor 22 and into upper mouth 52 of outfeed rotary valve 44 for transfer from steam housing 18.

Steam manifold elements 80 within steam housing 18 above belt conveyor 22 spray steam onto food particles 41 as they pass through steam housing 18. The steam maintains a constant temperature within steam housing 18 of about 212 degrees Fahrenheit. This temperature is sufficient to cook or blanch the bulk food particles within steam housing 18. Cooking duration can be varied by controlling the speed of conveyor 22 and the corresponding time required for the food particles to travel the entire length of steam housing 18.

A problem with the continuous process steam cooker and blancher described above is that the depth of product on belt conveyor 22 must be limited to insure even heat distribution from top to bottom of the product depth. If the food particles on the belt conveyor have too great a depth, the uppermost particles will achieve much greater heating and cooking than the lower particles.

The invention described below overcomes this problem, providing even heating and cooking throughout a much greater depth of food particles without increasing retention time within the cooker/blancher. In fact, retention time can often be decreased, even with a greater product depth. In either case, the invention result in greater product capacity in comparison to the prior art apparatus described above.

BRIEF DESCRIPTION OF THE DRAWINGS

A preferred embodiment of the invention is described below with reference to the accompanying drawings in which.

DETAILED DESCRIPTION OF THE PREFERRED EMBODIMENT

This disclosure of the invention is submitted in furtherance of the constitutional purposes of the U.S. Patent Laws "to promote the progress of science and useful arts." U.S. Constitution, Article 1, Section 8.

The invention described below is an apparatus for cooking or blanching bulk food products. The term "bulk food" is used throughout this specification to indicate food products which are not handled during processing on an individual basis, but rather are transported and processed in a continuous, randomly-packed, and undifferentiated mass product flow. Individual constituents of such a product mass are referred to as "particles." The term "particles" is not intended to convey any idea of size, since the invention is effective when used with bulk food particles having a variety of sizes and characteristics.

Described below is a preferred embodiment of a continuous-process forced-steam cooker/blancher for cooking or blanching a depth of bulk food particles by supporting the food particles on a perforated particle support surface and by forcing steam through said depth of bulk food particles and through the extended perforated particle support surface. More specifically, such a preferred embodiment continuous process blancher/cooker cooks or blanches a continuous flow of bulk food particles by (1) conveying a depth of food particles on a perforated moving belt conveyor under an upper steam plenum; (2) sealing the upper steam plenum against said depth of food particles; (3) introducing steam into the steam plenum; and (4) creating a pressure within the steam plenum to force the steam through said depth of bulk food particles and through the perforated belt conveyor.

Physical elements of the continuous process blancher/cooker include a horizontal extended particle support surface and walls extending upwardly from the particle support surface. The particle support surface is perforated to allow steam passage therethrough. Pressure means is included for forcing steam through a depth of food particles contained within the walls on the support surface and through the perforated particle support surface.

In the preferred embodiment of the invention described below, the extended particle support surface comprises a perforated endless belt conveyor. The pressure means includes a steam plenum over the depth of bulk food particles and a fluid pressurizing means such as a fan which communicates with the steam plenum to create a positive pressure within the steam plenum, thus forcing steam through the underlying bulk food particles and through the perforated endless belt conveyor.

FIGS. 3-7 shows the preferred embodiment of a continuous-process forced-steam blancher/cooker in accordance with the invention, generally designated by the reference numeral 100. Blancher/cooker 100 includes a frame 112, an outer cover 114, and a lower drip pan 116. Outer cover 114 seals over lower drip pan 116 to form a sealed steam housing 118 which rests atop frame 112. Outer cover 114 and lower drip pan 116 are insulated to conserve heat within steam housing 118. Drains 119 are provided in lower drip pan 116 to allow condensed water to escape steam housing 118.

Outer cover 114 has a height at its extreme longitudinal ends 120 which is sufficient to accommodate a desired height of bulk food particles as described below. A middle section 121 of outer cover 114 has an increased height to accommodate elements and components which are also described below.

An endless belt conveyor 122 runs longitudinally within cooker/blancher 100 from an infeed end 124 to an outfeed end 126. Belt conveyor 122 is perforated to allow fluid passage therethrough while also forming an extended particle support surface to support and move a continuous flow of bulk food particles along the length of cooker/blancher 100. In the preferred embodiment shown, belt conveyor 122 is a stainless steel mesh or woven wire belt such as commonly available for use in food processing machines. Such a belt conveyor has apertures which are sufficient in number and size to allow fluid to pass through the belt conveyor while still supporting food particles. Other types of endless belt conveyors may be substituted for a mesh belt. For example, in some applications it might be desirable to use a "slat" belt which has opposed endless chains with lateral slats or rods extending between the chains. In this case, the spacing between the slats would form the perforations. Other types of perforated belt conveyors are also possible, the only requirement being that the conveyor form a support surface for bulk food particles while allowing fluid to pass through the bulk food particles and the support surface.

Belt conveyor 122 is supported at its infeed end 124 by a set of idler rollers 128 and at its outfeed end by a set of drive rollers 130. A conveyor drive motor 132 is connected to drive rollers 130 by a conveyor drive belt (not shown) to drive belt conveyor 122. A conveyor support rail 136 runs longitudinally beneath the upper run of belt conveyor 122 at its lateral edges to provide vertical support to belt conveyor 122 along its length.

Outer cover 114 includes opposed inner sidewalls 138 which extend longitudinally along the entire length of belt conveyor 122 above its lateral edges. Sidewalls 138 extend upwardly from adjacent the upper surface of belt conveyor 122 to contain a depth of bulk food particles 141 on belt conveyor 122 between sidewalls 138 and to seal between the inner sidewalls and the belt conveyor.

Infeed and outfeed rotary air lock valves 142 and 144 are attached to the extreme longitudinal ends 120 of steam housing 118 to allow food particles 141 to enter and exit steam housing 118 while maintaining a sealed atmosphere within steam housing 118. Each of rotary valves 142 and 144 contains a lateral shaft to which a plurality of radially extending blades are attached. The shaft and attached blades rotate to transfer food particles 141 through the rotary valve without allowing steam to escape from steam housing 118.

Infeed rotary valve 142 has an upper hopper 148 which funnels food particles 141 into rotary valve 142. Infeed rotary valve 142 also has a lower chute 150 which directs food particles 141 from rotary valve 142 onto belt conveyor 122. Outfeed rotary valve 144 has an upper mouth 152 which receives food particles 141 as they fall from outfeed end 126 of belt conveyor 122 and which funnels food particles 141 into outfeed rotary valve 144 for transfer from steam housing 118.

At the extreme longitudinal ends 120 of outer cover 114 sidewalls 138 extend downward from the upper wall of outer cover 114. An inner hood 154 is formed by sidewalls 138, the upper walls of outer cover 114 at its extreme longitudinal ends 120, and by an inner arched roof 155 which extends laterally within middle section 121 of outer cover 114 between sidewalls 138.

Inner hood 154 additionally includes an infeed transverse wall 156, an intermediate transverse wall 158, and a outfeed transverse wall 160. Infeed and outfeed transverse walls 156 and 160 extend downward from outer cover 114 above infeed end 124 and outfeed end 126 of belt conveyor 122. Intermediate transverse wall 158 extends downward from arched roof 155 approximately midway between infeed and outfeed transverse walls 156 and 160.

Each of transverse walls 156, 158 and 160 has a transverse seal 162 extending downwardly toward belt conveyor 122. Seals 162 are preferably flaps of a flexible rubber-like material such as Buna-N or Hypalon which are attached to the lower edges of the transverse walls to seal against the upper surface of the depth of food particles 141 on belt conveyor 122.

Inner hood 154 is sealed by sidewalls 138 and transverse walls 156, 158, and 160 against the depth of food particles 141 on belt conveyor 122 to form inner pressure chambers or steam plenums 164 and 166 over food particles 141. Rotary fans 168 and 170 are positioned on arched roof 155 of inner hood 154 to communicate with steam plenums 164 and 166. Fans 168 and 170 are driven by fan drive motors 172 which are mounted outside steam housing 118. A fan drive shaft 174 extends upwardly from each of fans 168 and 170 to a pulley 176 above outer cover 114. Drive belts 178 connect between motors 172 and pulleys 176 to drive fans 168 and 170.

Steam outlet means, more specifically a plurality of steam outlet pipes 180, are positioned within sealed steam housing 118 and outside steam plenums 164 and 166 to emit steam within steam housing 118. Such steam is drawn by fans 168 and 170 into steam plenums 164 and 166.

Figure 4:
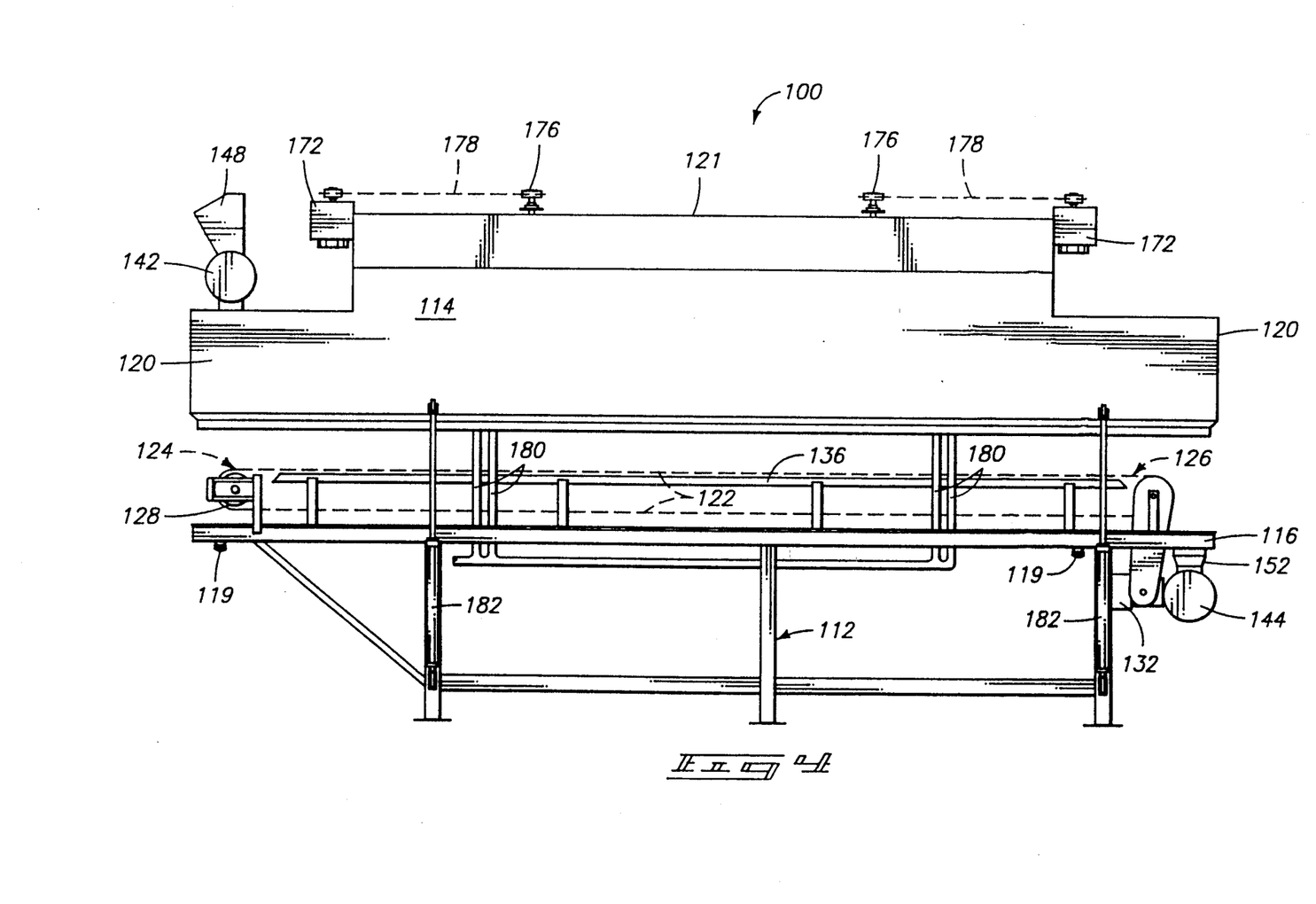
FIG. 4 is a side view of the cooker/blancher of FIG. 3, with its outer cover raised.
Figure 5:
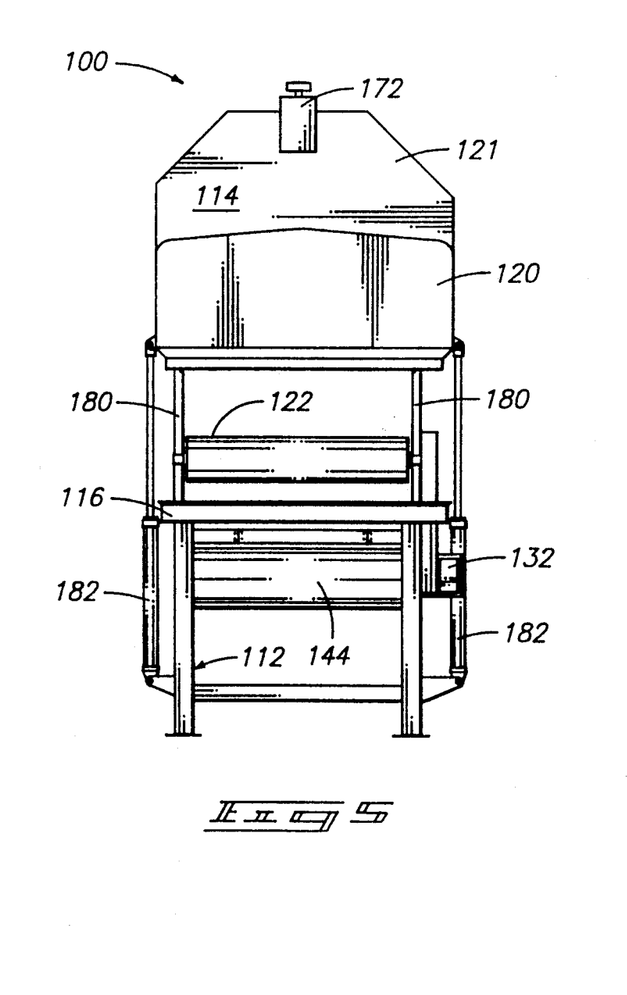
FIG. 5 is an end view of the cooker/blancher of FIG. 3, with its outer cover raised.

Cooker/blancher 100 also includes means for raising and lowering outer cover 114 and inner hood 154 for access to belt conveyor 122 and other components normally within steam housing 118. Such means comprises four hydraulic or pneumatic cylinders 182 positioned vertically between frame 112 and outer cover 114.

Figure 3:
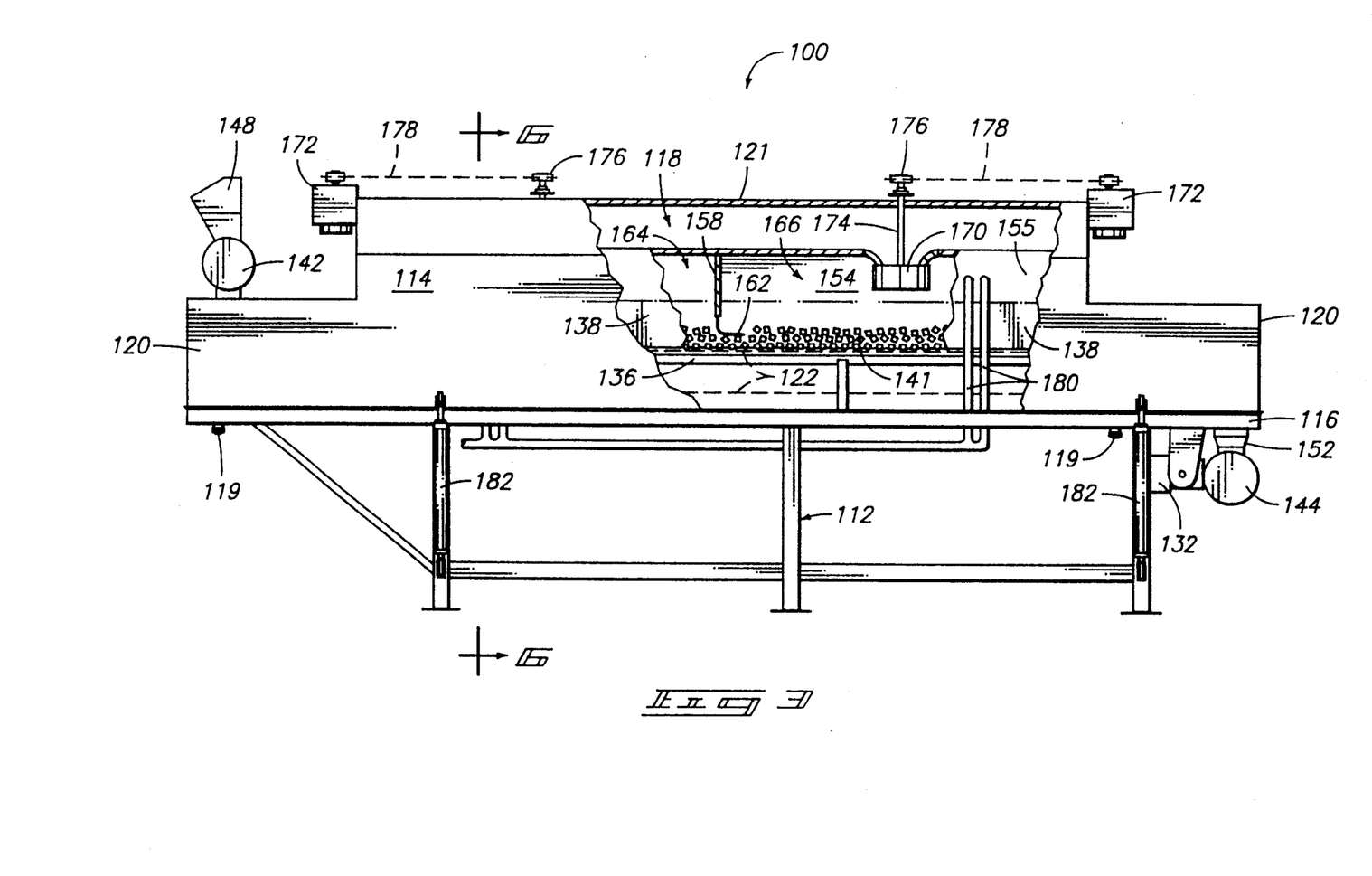
FIG. 3 is a side view of a preferred embodiment of an improved continuous process steam cooker/blancher in accordance with the invention, with its outer cover and inner hood partially broken away.
Figure 6:
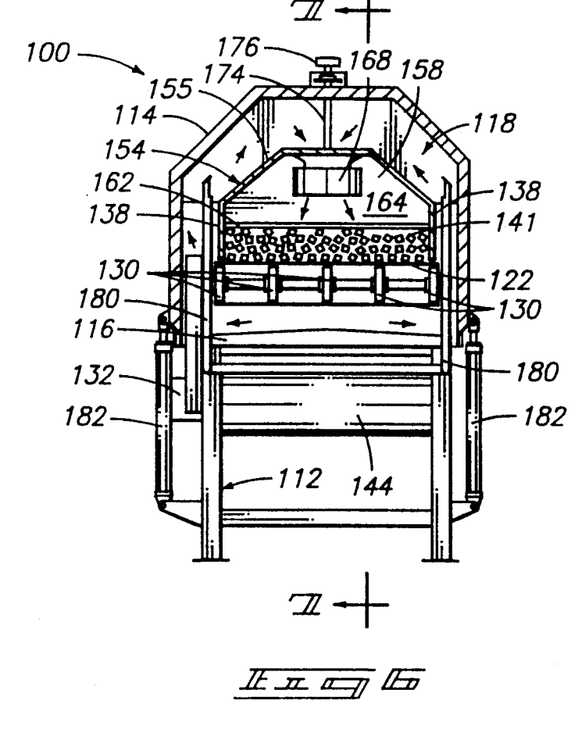
FIG. 6 is a cross-sectional view of the cooker/blancher of FIG. 3, taken along the line 6—6 of FIG. 3.
Figure 7:
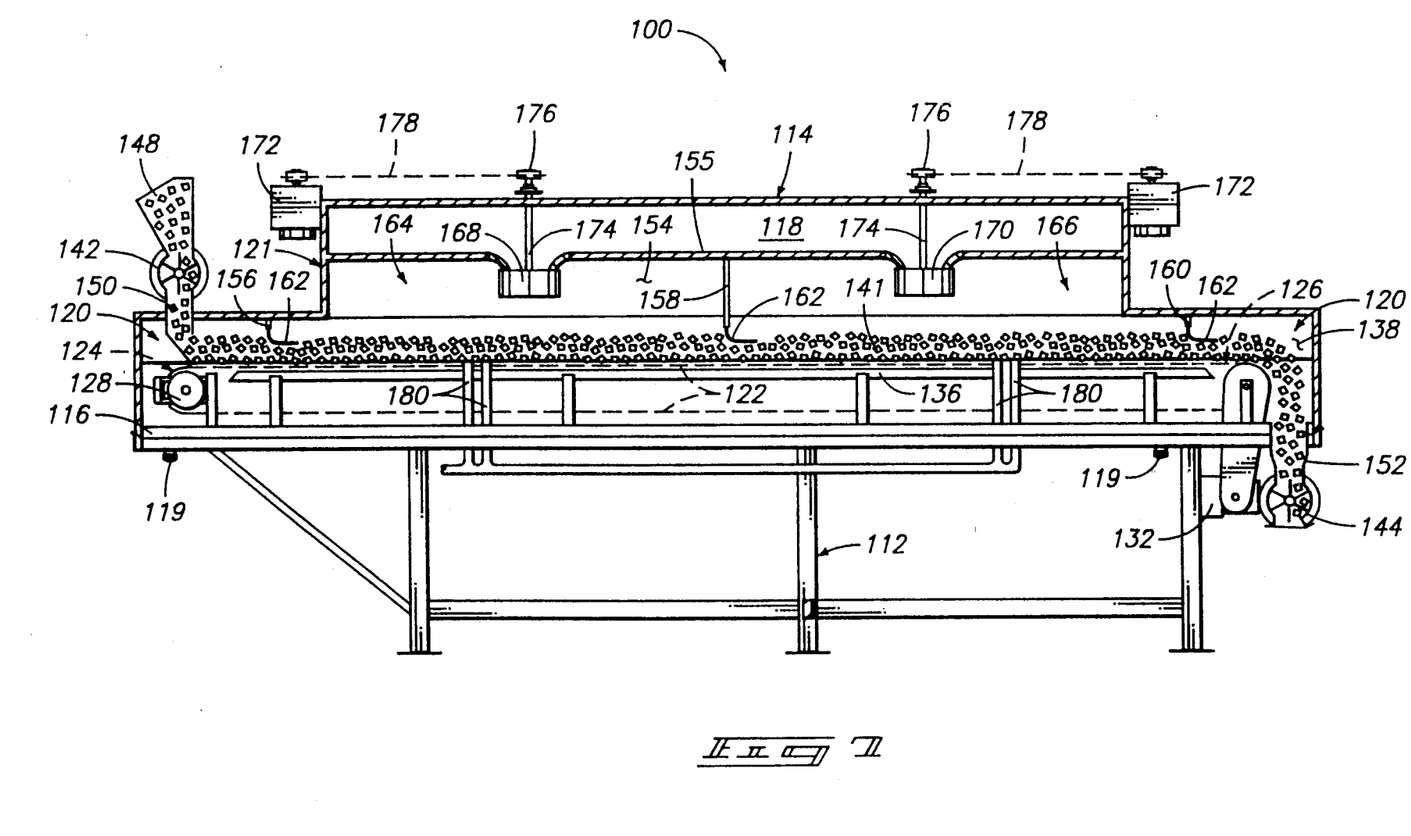
FIG. 7 is a cross-sectional view of the cooker/blancher of FIG. 3, taken along the line 7—7 of FIG. 6.

When outer cover 114 and inner hood 154 are lowered over the depth of food particles 141, outer cover 114 and drip tray 116 form steam housing 118 which contains belt conveyor 122. Steam housing 118 also contains positive atmospheric pressure means for forcing steam through the depth of food particles 141 and through perforated belt conveyor 122. Said positive pressure means comprises steam plenums 164 and 166 which are formed within steam housing 118 by inner hood 154. The positive pressure means also includes fans 168 and 170 which are positioned in arched roof 155 of inner hood 154.

In operation, rotary valve 142 transfers a continuous supply of bulk food particles 141 such as diced vegetables onto belt conveyor 122 at its infeed end 124. The particles accumulate to a desired depth and travel through steam housing 118 on conveyor 122. At the outfeed end 126 of belt conveyor 122, food particles 141 fall off belt conveyor 122 and into upper mouth 152 of outfeed rotary valve 144 for transfer out of steam housing 118. Transverse seals 162 seal against food particles 141 as they pass beneath transverse walls 156, 158, and 160.

Steam plenums 164 and 166 thus seal against the depth of food particles 141. Fans 168 and 170 draw steam from steam outlet pipes 180 into steam plenums 164 and 166, creating a positive fluid pressure within steam plenums 164 and 166. The positive pressure forces the steam downward through the depth of bulk food particles 141 contained between sidewalls 138 on belt conveyor 122 and through perforated belt between 122. The steam is recirculated around the outside of inner hood 154 within sealed steam housing 118 back to fans 168 and 170.

Preliminary tests were performed in which fans 168 and 170 were sized to provide 75 CFM per square foot surface area of ⅜ inch diced Pontiac Red potatoes. The diced potatoes had a depth of 4½ inches. If was found that a retention time of 12 minutes beneath the steam plenums was sufficient for thorough cooking through the depth of potatoes.

In contrast, the prior art steam cooker required a retention time of over 22 minutes at the same product depth to obtain the same degree of cooking. Shorter retention times resulted inadequate or uneven cooking, especially at lower levels of the product depth.

The preliminary tests indicate that the cooker/blancher of this invention is capable of a much greater product capacity than previous cooker/blanchers. This increased capacity may be realized by decreased retention time or by increased depth of product.

Further improvements can be achieved by positioning fans 168 and 170 to created opposite pressures within their respective steam plenums. Specifically, fan 168 is positioned to force steam into steam plenum 164, creating a positive pressure within steam plenum 164 to force steam downward through bulk food particles 141 and through belt conveyor 122. Fan 170 is positioned to force steam from steam plenum 166, creating a negative pressure within steam plenum 166 to draw steam upward through belt conveyor 122 and bulk food particles 141. Such an arrangement results in steam first entering the depth of food particles 141 from above, while food particles 141 are beneath steam plenum 164, and then from below, while food particles 141 are beneath steam plenum 166.

In compliance with the statute, the invention has been described in language more or less specific as to structural and methodical features. It is to be understood, however, that the invention is not limited to the specific features described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. An improved continuous-process cooker and blancher for cooking and blanching a depth of bulk food particles, comprising:
   a belt conveyor running longitudinally within the cooker and blancher to support and move a continuous flow of bulk food particles therein, the belt conveyor being perforated to allow fluid to pass through the belt conveyor;
   opposed sidewalls extending longitudinally along the belt conveyor above its lateral edges to maintain a depth of bulk food particles on the belt conveyor between the sidewalls;
   a hood over said depth of bulk food particles, the hood sealing against said depth of bulk food particles on the belt conveyor to form a steam plenum over said depth of bulk food particles; and
   fluid pressure means for pressurizing the steam plenum and for forcing steam through said depth of bulk food particles contained between the longitudinal sidewalls on the belt conveyor, and through the perforated belt conveyor.

2. The continuous-process cooker and blancher of claim 1 wherein the fluid pressure means comprises:
   a fan which communicates with the steam plenum to force steam through said depth of food particles beneath the steam plenum and through the perforated belt conveyor.

3. The continuous-process cooker and blancher of claim 1 wherein the pressure means comprises:
   a fan positioned to create a positive pressure within the steam plenum for forcing steam through said depth of food particles beneath the steam plenum and through the perforated belt conveyor.

4. An improved continuous-process cooker and blancher for cooking and blanching a depth of bulk food particles, comprising:
   a belt conveyor running longitudinally within the cooker and blancher to support and move a continuous flow of bulk food particles therein, the belt conveyor being perforated to allow fluid to pass through the belt conveyor;

opposed sidewalls extending longitudinally along the belt conveyor above its lateral edges to maintain a depth of bulk food particles on the belt conveyor between the sidewalls; and fluid pressure means for forcing steam through said depth of bulk food particles contained between the longitudinal sidewalls on the belt conveyor, and through the perforated belt conveyor;

wherein the fluid pressure means comprises:

first and second steam plenums over said depth of bulk food particles; and first and second fans which communicate with the first and second steam plenums, respectively, the first fan being positioned to create a positive pressure within the first steam plenum, the second fan being positioned to create a negative pressure within the second steam plenum.

5. An improved continuous-process cooker and blancher for cooking and blanching a depth of bulk food particles, comprising:

a belt conveyor running longitudinally within the cooker and blancher to support and move a continuous flow of bulk food particles therein, the belt conveyor being perforated to allow fluid to pass through the belt conveyor;

opposed sidewalls extending longitudinally along the belt conveyor above its lateral edges to maintain a depth of bulk food particles on the belt conveyor between the sidewalls; and fluid pressure means for forcing steam through said depth of bulk food particles contained between the longitudinal sidewalls on the belt conveyor, and through the perforated belt conveyor;

wherein the pressure means comprises a hood over said depth of bulk food particles, the hood including the opposed sidewalls and having transverse seals at its longitudinal ends to seal against said depth of bulk food particles on the belt conveyor and to form a steam plenum over said depth of bulk food particles.

6. The continuous-process cooker and blancher of claim 5 wherein:

the hood also has an intermediate transverse seal between the end transverse seals to seal against said depth of bulk food particles and to form first and second steam plenums over said depth of bulk food particles; and the pressure means further comprising first and second fans which communicate with the first and second steam plenums, respectively, the first fan being positioned to create a positive pressure within the first steam plenum, the second fan being positioned to create a negative pressure within the second steam plenum.

7. The continuous-process cooker and blancher of claim 5 and further comprising means for raising and lowering the hood, the transverse seals sealing.

8. An improved continuous-process cooker and blancher for cooking and blanching a depth of bulk food particles, comprising:

a belt conveyor running longitudinally within the cooker and blancher to support and move a continuous flow of bulk food particles therein, the belt conveyor being perforated to allow fluid to pass through the belt conveyor;

opposed sidewalls extending longitudinally along the belt conveyor above its lateral edges to maintain a depth of bulk food particles on the belt conveyor between the sidewalls; and fluid pressure means for forcing steam through said depth of bulk food particles contained between the longitudinal sidewalls on the belt conveyor, and through the perforated belt conveyor;

a sealed housing containing the belt conveyor and the pressure means;

the pressure means comprising (a) a steam plenum over said depth of bulk food particles and (b) a fan which communicates with the steam plenum to force steam through said depth of food particles beneath the steam plenum and through the perforated belt conveyor;

said steam being recirculated through the sealed housing.

9. A continuous-process cooker and blancher for cooking and blanching a depth of bulk food particles, comprising:

a belt conveyor running longitudinally through the cooker and blancher to support and move a continuous flow of bulk food particles therein, the belt conveyor being perforated to allow fluid to pass through the belt conveyor;

a hood over the belt conveyor, the hood including opposed sidewalls extending longitudinally along the belt conveyor above its lateral edges to contain a depth of bulk food particles on the belt conveyor between the sidewalls, the hood being sealed against said depth of bulk food particles on the belt conveyor to form a steam plenum over said depth of bulk food particles;

steam outlet means for emitting steam;

a fan which communicates with the steam plenum to force the steam through said depth of bulk food particles contained between the sidewalls on the belt conveyor and through the perforated belt conveyor.

10. The continuous-process cooker and blancher of claim 9 wherein the fan is positioned to create a positive pressure within the steam plenum.

11. The continuous-process cooker and blancher of claim 9 wherein the hood forms first and second steam plenums over said depth of bulk food particles;

the cooker and blancher further comprising first and second fans which communicate with the first and second steam plenums, respectively, the first fan being positioned to create a positive pressure within the first steam plenum, the second fan being positioned to create a negative pressure within the second steam plenum.

12. The continuous-process cooker and blancher of claim 9 further comprising means for raising the hood to allow access to the belt conveyor.

13. The continuous-process cooker and blancher of claim 9 the hood having transverse seals at its longitudinal ends to seal against said depth of bulk food particles on the belt conveyor.

14. The continuous-process cooker and blancher of claim 9 wherein:

the hood has transverse seals at its longitudinal ends to seal against said depth of bulk food particles on the belt conveyor, the hood also having an intermediate transverse seal between the end transverse seals to seal against said depth of bulk food particles and to form first and second steam plenums over said depth of bulk food particles; and the cooker and blancher further comprises first and second fans which communicate with the first and second steam plenums, respectively, the first fan being positioned to create a positive fluid pressure within the first steam plenum, the second fan being positioned to create a negative pressure within the second steam plenum.

15. The continuous-process cooker and blancher of claim 9 further comprising means for raising and lowering the hood, the hood having transverse seals at its longitudinal ends to seal against said depth of bulk food particles on the belt conveyor when the hood is lowered.

16. The continuous-process cooker and blancher of claim 9 wherein the fan is positioned on the hood to force steam through said depth of food particles contained between the longitudinal sidewalls on the belt conveyor and through the perforated belt conveyor.

17. The continuous-process cooker and blancher of claim 9, further comprising a sealed housing containing the belt conveyor and the hood;

the fan being positioned on the hood to force steam through said depth of food particles contained between the longitudinal sidewalls on the belt conveyor and through the perforated belt conveyor;

said steam being recirculated through the sealed housing;

the steam outlet means being contained within the sealed housing outside the steam plenum.

18. The continuous-process cooker and blancher of claim 9, further comprising:

means for raising and lowering the hood, the hood having transverse seals at its longitudinal ends to seal against said depth of bulk food particles on the belt conveyor when the hood is lowered;

a sealed housing containing the belt conveyor and the hood;

the fan being positioned on the hood to force steam through said depth of food particles contained between the longitudinal sidewalls on the belt conveyor and through the perforated belt conveyor;

said steam being recirculated through the sealed housing.

19. A forced-steam cooker and blancher for cooking and blanching a depth of bulk food particles, comprising:

an extended particle support surface which is perforated to allow fluid to pass through the particle support surface;

walls extending upwardly from the particle support surface to contain a depth of bulk food particles on the support surface; and fluid pressure means for forcing steam through a depth of bulk food particles contained within the walls on the support surface and through the perforated particle support surface;

the pressure means comprising a hood over said depth of bulk food particles, the forced-steam cooker and blancher further comprising means for raising and lowering the hood, the hood being sealed against said depth of bulk food particles on the particle support surface when the hood is lowered.

20. A forced-steam cooker and blancher for cooking and blanching a depth of bulk food particles, comprising:

an extended particle support surface which is perforated to allow fluid to pass through the particle support surface;

walls extending upwardly from the particle support surface to contain a depth of bulk food particles on the support surface; and fluid pressure means for forcing steam through a depth of bulk food particles contained within the walls on the support surface and through the perforated particle support surface;

a sealed housing containing the perforated particle support surface and the pressure means;

the pressure means comprising (a) a steam plenum over said depth of bulk food particles and (b) a fan which communicates with the steam plenum to force steam through said depth of food particles beneath the steam plenum and through the perforated particle support surface;

said steam being recirculated through the sealed housing.

21. A forced-steam cooker and blancher for cooking and blanching a depth of bulk food particles, comprising:

an extended particle support surface which is perforated to allow fluid to pass through the particle support surface;

walls extending upwardly from the particle support surface to contain a depth of bulk food particles on the support surface; and fluid pressure means for forcing steam through a depth of bulk food particles contained within the walls on the support surface and through the perforated particle support surface;

a sealed housing containing the perforated support surface and the pressure means;

the pressure means comprising (a) a steam plenum over said depth of bulk food particles and (b) a fan which communicates with the steam plenum to force steam through said depth of food particles beneath the steam plenum and through the perforated particle support surface;

said steam being recirculated through the sealed housing;

the forced-steam cooker and blancher also comprising steam outlet means within the sealed housing outside the steam plenum.

* * * * *